(12) United States Patent
Crow et al.

(10) Patent No.: US 8,390,645 B1
(45) Date of Patent: *Mar. 5, 2013

(54) METHOD AND SYSTEM FOR RENDERING CONNECTING ANTIALIASED LINE SEGMENTS

(75) Inventors: Franklin C. Crow, Portola Valley, CA (US); John S. Montrym, Los Altos Hills, CA (US); David K. McAllister, Holladay, UT (US); Craig M. Wittenbrink, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 1258 days.

This patent is subject to a terminal disclaimer.

(21) Appl. No.: 11/313,075

(22) Filed: Dec. 19, 2005

(51) Int. Cl.
G09G 5/00 (2006.01)

(52) U.S. Cl. ......... 345/613; 345/611; 345/612; 345/614

(58) Field of Classification Search ............... 345/611, 345/612, 613, 614, 615, 616
See application file for complete search history.

(56) References Cited

U.S. PATENT DOCUMENTS

| | | | |
|---|---|---|---|
| 4,208,810 A | 6/1980 | Rohner et al. | |
| 4,918,626 A | 4/1990 | Watkins et al. | |
| 5,081,594 A | 1/1992 | Horsley | |
| 5,287,438 A | 2/1994 | Kelleher | |
| 5,313,287 A | 5/1994 | Barton | |
| 5,432,898 A | 7/1995 | Curb et al. | |
| 5,446,836 A | 8/1995 | Lentz et al. | |
| 5,452,104 A | 9/1995 | Lee | |
| 5,452,412 A * | 9/1995 | Johnson et al. ............ 345/443 |
| 5,483,258 A | 1/1996 | Cornett et al. | |
| 5,543,935 A | 8/1996 | Harrington | |
| 5,570,463 A | 10/1996 | Dao | |
| 5,594,854 A | 1/1997 | Baldwin et al. | |
| 5,623,692 A | 4/1997 | Priem et al. | |
| 5,664,162 A | 9/1997 | Dye | |
| 5,815,162 A | 9/1998 | Levine | |
| 5,854,631 A | 12/1998 | Akeley et al. | |
| 5,854,637 A | 12/1998 | Sturges | |
| 5,872,902 A | 2/1999 | Kuchkuda et al. | |
| 5,977,987 A | 11/1999 | Duluk, Jr. | |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

(Continued)

*Primary Examiner* — My-Chau T Tran

(57) ABSTRACT

A method for rendering a plurality of line primitives. The method includes the step of accessing a first line primitive and a second line primitive of a line strip. For a junction between the first line primitive and the second line primitive, the first line primitive and the second line primitive are geometrically modified to generate an abutting edge between the first line primitive and the second line primitive. A majority status is assigned to a pixel on the abutting edge. A first color of the first line primitive or a second color of the second line primitive is allocated to the pixel in accordance with the majority status.

20 Claims, 17 Drawing Sheets

U.S. PATENT DOCUMENTS

| | | | |
|---|---|---|---|
| 6,028,608 A * | 2/2000 | Jenkins | 345/619 |
| 6,034,699 A | 3/2000 | Wong et al. | |
| 6,072,500 A | 6/2000 | Foran et al. | |
| 6,104,407 A | 8/2000 | Aleksic et al. | |
| 6,104,417 A | 8/2000 | Nielsen et al. | |
| 6,115,049 A | 9/2000 | Winner et al. | |
| 6,118,394 A | 9/2000 | Onaya | |
| 6,128,000 A | 10/2000 | Jouppi et al. | |
| 6,137,918 A | 10/2000 | Harrington et al. | |
| 6,160,557 A | 12/2000 | Narayanaswami | |
| 6,160,559 A | 12/2000 | Omtzigt | |
| 6,188,394 B1 | 2/2001 | Morein et al. | |
| 6,201,545 B1 | 3/2001 | Wong et al. | |
| 6,204,859 B1 | 3/2001 | Jouppi et al. | |
| 6,219,070 B1 | 4/2001 | Baker et al. | |
| 6,249,853 B1 | 6/2001 | Porterfield | |
| 6,259,460 B1 | 7/2001 | Gossett et al. | |
| 6,323,874 B1 | 11/2001 | Gossett | |
| 6,359,623 B1 | 3/2002 | Larson | |
| 6,362,819 B1 | 3/2002 | Dalal et al. | |
| 6,366,289 B1 | 4/2002 | Johns | |
| 6,429,877 B1 | 8/2002 | Stroyan | |
| 6,437,780 B1 | 8/2002 | Baltaretu et al. | |
| 6,452,595 B1 | 9/2002 | Montrym et al. | |
| 6,469,707 B1 | 10/2002 | Voorhies | |
| 6,480,205 B1 | 11/2002 | Greene et al. | |
| 6,501,564 B1 | 12/2002 | Schramm et al. | |
| 6,504,542 B1 | 1/2003 | Voorhies et al. | |
| 6,522,329 B1 | 2/2003 | Ihara et al. | |
| 6,525,737 B1 | 2/2003 | Duluk, Jr. et al. | |
| 6,529,207 B1 * | 3/2003 | Landau et al. | 345/619 |
| 6,606,093 B1 | 8/2003 | Gossett et al. | |
| 6,611,272 B1 | 8/2003 | Hussain et al. | |
| 6,614,444 B1 | 9/2003 | Duluk, Jr. et al. | |
| 6,614,448 B1 | 9/2003 | Garlick et al. | |
| 6,624,823 B2 | 9/2003 | Deering | |
| 6,633,197 B1 | 10/2003 | Sutardja | |
| 6,633,297 B2 | 10/2003 | McCormack et al. | |
| 6,646,639 B1 | 11/2003 | Greene et al. | |
| 6,671,000 B1 | 12/2003 | Cloutier | |
| 6,693,637 B2 | 2/2004 | Koneru et al. | |
| 6,693,639 B2 | 2/2004 | Duluk, Jr. et al. | |
| 6,697,063 B1 | 2/2004 | Zhu | |
| 6,717,576 B1 * | 4/2004 | Duluk et al. | 345/419 |
| 6,717,578 B1 | 4/2004 | Deering | |
| 6,734,861 B1 | 5/2004 | Van Dyke et al. | |
| 6,741,247 B1 | 5/2004 | Fenney | |
| 6,765,575 B1 | 7/2004 | Voorhies et al. | |
| 6,778,177 B1 | 8/2004 | Furtner | |
| 6,788,301 B2 | 9/2004 | Thrasher | |
| 6,798,410 B1 | 9/2004 | Redshaw et al. | |
| 6,803,916 B2 | 10/2004 | Ramani et al. | |
| 6,819,332 B2 | 11/2004 | Baldwin | |
| 6,833,835 B1 | 12/2004 | van Vugt | |
| 6,906,716 B2 | 6/2005 | Moreton et al. | |
| 6,938,176 B1 | 8/2005 | Alben et al. | |
| 6,940,514 B1 | 9/2005 | Wasserman et al. | |
| 6,947,057 B2 | 9/2005 | Nelson et al. | |
| 6,956,579 B1 | 10/2005 | Diard et al. | |
| 6,961,057 B1 | 11/2005 | Van Dyke et al. | |
| 6,978,317 B2 | 12/2005 | Anantha et al. | |
| 7,002,591 B1 | 2/2006 | Leather et al. | |
| 7,009,607 B2 | 3/2006 | Lindholm et al. | |
| 7,009,615 B1 | 3/2006 | Kilgard et al. | |
| 7,061,495 B1 | 6/2006 | Leather | |
| 7,064,771 B1 | 6/2006 | Jouppi et al. | |
| 7,075,542 B1 | 7/2006 | Leather | |
| 7,081,902 B1 | 7/2006 | Crow et al. | |
| 7,119,809 B1 | 10/2006 | McCabe | |
| 7,126,600 B1 | 10/2006 | Fowler et al. | |
| 7,154,066 B2 | 12/2006 | Talwar et al. | |
| 7,158,148 B2 | 1/2007 | Toji et al. | |
| 7,170,515 B1 | 1/2007 | Zhu | |
| 7,184,040 B1 | 2/2007 | Tzvetkov | |
| 7,224,364 B1 | 5/2007 | Yue et al. | |
| 7,307,628 B1 | 12/2007 | Goodman et al. | |
| 7,307,638 B2 | 12/2007 | Leather et al. | |
| 7,382,368 B1 * | 6/2008 | Molnar et al. | 345/421 |
| 7,453,466 B2 | 11/2008 | Hux et al. | |
| 7,483,029 B2 | 1/2009 | Crow et al. | |
| 7,548,996 B2 | 6/2009 | Baker et al. | |
| 7,551,174 B2 | 6/2009 | Iourcha et al. | |
| 7,633,506 B1 | 12/2009 | Leather et al. | |
| 7,634,637 B1 | 12/2009 | Lindholm et al. | |
| 7,791,617 B2 | 9/2010 | Crow et al. | |
| 7,965,902 B1 | 6/2011 | Zelinka et al. | |
| 8,063,903 B2 | 11/2011 | Vignon et al. | |
| 2001/0005209 A1 | 6/2001 | Lindholm et al. | |
| 2002/0050979 A1 | 5/2002 | Oberoi et al. | |
| 2002/0097241 A1 | 7/2002 | McCormack et al. | |
| 2002/0130863 A1 | 9/2002 | Baldwin | |
| 2002/0140655 A1 | 10/2002 | Liang et al. | |
| 2002/0158885 A1 | 10/2002 | Brokenshire et al. | |
| 2002/0196251 A1 | 12/2002 | Duluk, Jr. et al. | |
| 2003/0067468 A1 | 4/2003 | Duluk, Jr. et al. | |
| 2003/0076325 A1 | 4/2003 | Thrasher | |
| 2003/0122815 A1 | 7/2003 | Deering | |
| 2003/0163589 A1 | 8/2003 | Bunce et al. | |
| 2003/0194116 A1 | 10/2003 | Wong et al. | |
| 2003/0201994 A1 | 10/2003 | Taylor et al. | |
| 2004/0085313 A1 | 5/2004 | Moreton et al. | |
| 2004/0130552 A1 | 7/2004 | Duluk, Jr. et al. | |
| 2004/0183801 A1 | 9/2004 | Deering | |
| 2004/0196285 A1 | 10/2004 | Rice et al. | |
| 2004/0207642 A1 | 10/2004 | Crisu et al. | |
| 2004/0246251 A1 | 12/2004 | Fenney et al. | |
| 2005/0030314 A1 | 2/2005 | Dawson | |
| 2005/0041037 A1 | 2/2005 | Dawson | |
| 2005/0066148 A1 | 3/2005 | Luick | |
| 2005/0122338 A1 | 6/2005 | Hong et al. | |
| 2005/0134588 A1 | 6/2005 | Aila et al. | |
| 2005/0134603 A1 | 6/2005 | Iourcha et al. | |
| 2005/0179698 A1 | 8/2005 | Vijayakumar et al. | |
| 2005/0259100 A1 | 11/2005 | Teruyama | |
| 2006/0044317 A1 | 3/2006 | Bourd et al. | |
| 2006/0170690 A1 | 8/2006 | Leather | |
| 2006/0203005 A1 | 9/2006 | Hunter | |
| 2006/0245001 A1 | 11/2006 | Lee et al. | |
| 2006/0267981 A1 | 11/2006 | Naoi | |
| 2007/0139440 A1 * | 6/2007 | Crow et al. | 345/614 |
| 2007/0268298 A1 | 11/2007 | Alben et al. | |
| 2007/0273689 A1 | 11/2007 | Tsao | |
| 2007/0296725 A1 | 12/2007 | Steiner et al. | |
| 2008/0024497 A1 | 1/2008 | Crow et al. | |
| 2008/0024522 A1 | 1/2008 | Crow et al. | |
| 2008/0100618 A1 | 5/2008 | Woo et al. | |
| 2008/0273218 A1 | 11/2008 | Kitora et al. | |

FOREIGN PATENT DOCUMENTS

| | | |
|---|---|---|
| JP | 10134198 | 5/1998 |
| JP | 11195132 A | 7/1999 |
| JP | 2005182547 | 7/2005 |
| WO | 0013145 | 3/2000 |

OTHER PUBLICATIONS

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

A Parallel Alogorithm for Polygon Rasterization Juan Pineda Jun. 1988 ACM.

A Hardware Assisted Design Rule Check Architecture Larry Seiler Jan. 1982 Proceedings of the 19th Conference on Design Automation DAC '82 Publisher: IEEE Press.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press ACM SIGGRAPH Computer Graphics vol. 12 Issue 3, Aug. 1978.

Non-Final OA Dated Nov. 27, 2007; U.S. Appl. No. 11/304,904.
Non-Final OA Dated May 1, 2007; U.S. Appl. No. 11/304,904.
Office Action dated Feb. 2, 2005; U.S. Appl. No. 10/671,237.
Office Action dated Aug. 22, 2005; U.S. Appl. No. 10/671,237.
Advisory Action dated Nov. 29, 2005; U.S. Appl. No. 10/671,237.
Notice of Allowance dated Apr. 4, 2006; U.S. Appl. No. 10/671,237.

Blythe, OpenGL section 3.4.1, Basic Line Segment Rasterization, Mar. 29, 1997, pp. 1-3.
Foley, J. "Computer Graphics: Principles and Practice", 1987, Addison-Wesley Publishing, 2nd Edition, p. 545-546.

* cited by examiner

METHOD AND SYSTEM FOR RENDERING CONNECTING ANTIALIASED LINE SEGMENTS

CROSS REFERENCE TO RELATED APPLICATIONS

This application is related to, and incorporates by reference, the following commonly assigned U.S. Patent Applications:
A METHOD AND SYSTEM FOR RENDERING POLYGONS HAVING ABUTTING EDGES, by Crow et al., filed on Dec. 19, 2005, Ser. No. 11/312,962, and A METHOD AND SYSTEM OR RENDERING POLYGONS WITH A BOUNDING BOX IN A GRAPHICS PROCESSOR UNIT, by Crow, F., filed on Dec. 19, 2005, Ser. No. 11/312,919.

FIELD OF THE INVENTION

The present invention is generally related to hardware accelerated graphics computer systems.

BACKGROUND OF THE INVENTION

Embodiments of the present invention provide a method and system for rendering polygons having abutting edges. Embodiments of the present invention provide fast and efficient real-time 3-D graphics rendering while ensuring foreground objects are properly anti-aliased against a background in order to preserve image quality.

In one embodiment, the present invention is implemented as a method for rendering adjacent polygons in a GPU. The method includes determining when a first polygon and a second polygon have an abutting edge (e.g., as in a case where multiple polygons are used to construct an object). If an abutting edge exists, a majority status is assigned to a pixel on the abutting edge. A first color of the first polygon or a second color of the second polygon is then allocated to the pixel in accordance with the majority status. In a typical implementation, at least one edge of the first polygon or the second polygon other than the abutting edge is anti-aliased with respect to a background color. The present embodiment saves the cost of the unnecessary blending operations by use of the majority status. The majority status can be determined by determining whether the first polygon or the second polygon covers a center of the pixel.

In one embodiment the abutting edge is determined by detecting when the first polygon and the second polygon have common vertices. Alternatively, the abutting edge can be determined by parsing a list of vertices describing a plurality of polygons (e.g., triangle strip, etc.), or by detecting a winged edged polyhedron.

SUMMARY OF THE INVENTION

Embodiments of the present invention provide a method and system for rendering polygons having abutting edges. Embodiments of the present invention provide fast and efficient real-time 3-D graphics rendering while ensuring foreground objects are properly anti-aliased against a background in order to preserve image quality.

In one embodiment, the present invention is implemented as a method for rendering a plurality of line primitives. The method includes the step of accessing a first line primitive and a second line primitive (e.g., line segments) of a line strip. For a junction between the first line primitive and the second line primitive, the first line primitive and the second line primitive are geometrically modified to generate an abutting edge between the first line primitive and the second line primitive. A majority status is assigned to a pixel on the abutting edge. A first color of the first line primitive or a second color of the second line primitive is allocated to the pixel in accordance with the majority status. In a typical implementation, at least one edge of the first line primitive or the second line primitive other than the abutting edge is anti-aliased with respect to a background color, and the abutting edge is configured to provide a continuous join between the first line primitive and the second line primitive. For example, one improvement is that the line segments no longer have a sequential read modify write dependency when being blended into the frame buffer. The blending can be done independently for each segment, thereby improving the performance of the system.

In one embodiment, an angle of the abutting edge is computed by summing respective direction vectors of the first line primitive and the second line primitive. In one embodiment, a plurality of line primitives between the first line primitive and the second line primitive and that do not exit the pixel can be accumulated to prevent multiple writes to the pixel. In one embodiment, a sub-pixel bounding box is used to crop the first line primitive and the second line primitive. Alternatively, a line rotated to a right angle to the abutting edge can be used to crop the first line primitive and the second line primitive.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
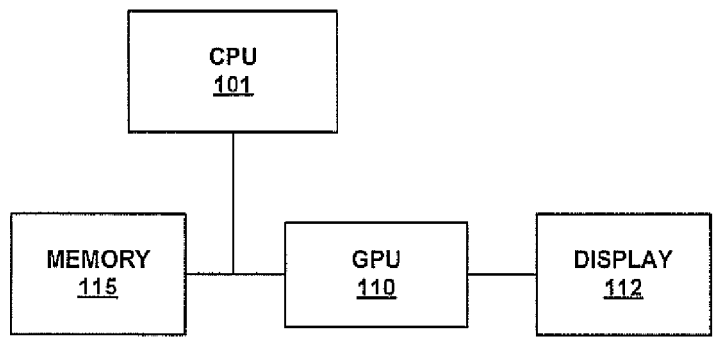
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 (e.g., excluding the display 112) can be implemented as a system-on-a-chip, or the like, suited for low power handheld devices (e.g., cellphone, etc.), or can be implemented as a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory can be included for the GPU 110 for high bandwidth graphics data storage.

Embodiments Of The Invention

Figure 2:
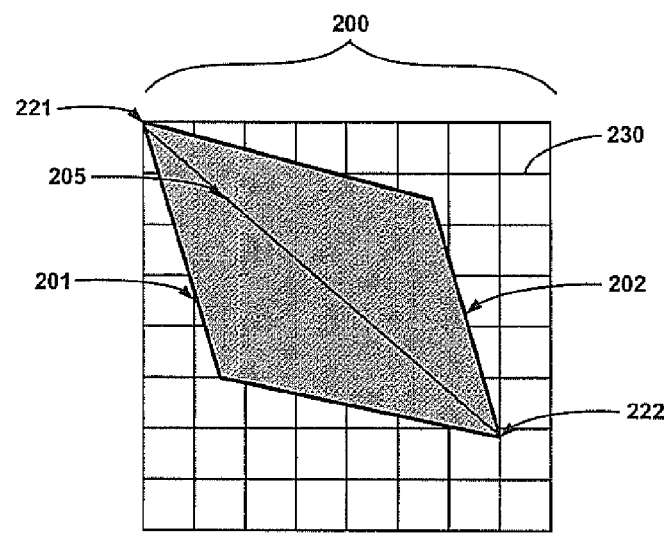
FIG. 2 shows a diagram depicting a first polygon and a second polygon rasterized against an 8×8 group of pixels.

FIG. 2 shows a diagram depicting a first polygon 201 and a second polygon 202 rasterized against an 8×8 group of pixels 200. One embodiment of the present invention is directed towards a problematic anti-aliasing situation whereby two polygons (e.g., polygon 201 and polygon 202) share a common edge and need to be anti-aliased against a background. Embodiments of the present invention are configured to optimally handle immediately adjacent, non-overlapping, polygons that are rendered against a contrasting background color. Such polygons are commonly encountered when rendering groups of primitives (e.g., triangle strips, etc.), or when rendering objects constructed from multiple primitives. Embodiments of the present invention maintain image quality and anti-aliasing quality while also avoiding adverse performance side effects, such as, for example, avoiding multiple writes to pixels (e.g., writes to a frame buffer memory) at the adjoining primitive edges (e.g., the shared edge 205 between polygons 201 and 202).

Embodiments of the present invention can utilize a number of different techniques to determine when adjacent polygons share a common edge. As shown in FIG. 2, the shared, or abutting, edge 205 is common to both the polygons 201 and 202. In one embodiment, the abutting edge 205 is detected through the fact that the polygons 201-202 have common vertices 221 and 222. Common vertices are a well-known attribute of rendering triangle strips. In other embodiments, the abutting edge can be determined by parsing a list of vertices describing a plurality of polygons, or by using a vertex pointer that indicates common vertices. In one embodiment, the abutting edge is determined by detecting a winged edged polyhedron. In another embodiment, the common edge can be found by noting that the endpoint vertices have the same coordinate values.

Figure 3:
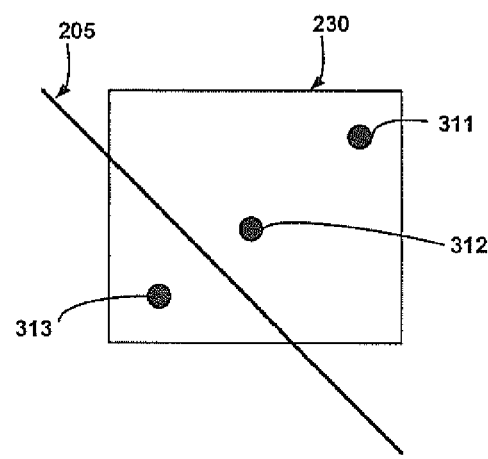
FIG. 3 shows a diagram depicting a pixel having three sample points in accordance with one embodiment of the present invention.

FIG. 3 shows a diagram depicting pixel 230 having three sample points 311-313 in accordance with one embodiment of the present invention. As described above, the present invention improves real-time 3-D rendering performance by avoiding multiple writes to the same pixel along the abutting edge between the polygons 201 and 202.

In one embodiment, the present invention avoids multiple writes to the same pixel along the abutting edge 205 between the polygons 201 and 202 by choosing to write only those pixels whose center lies on the near side of the edge joining the triangle being rasterized to the adjacent triangle or line. One such pixel 230 is shown.

As depicted in FIG. 3, the pixel 230 includes multisampling points for anti-aliasing, in this case three such sample points 311-313. The sample points 311-313 are used to determine which side of the abutting edge 205 covers the center of the pixel. In the FIG. 3 example, the abutting edge 205 is to the left of the pixel center (e.g., sample point 312). This indicates polygon 202 covers the center of the pixel 230. When a determination is made as to which polygon covers the center of the pixel 230, a majority status is thereby determined for the pixel. For example, in the FIG. 3 depiction, since polygon 202 covers the center of the pixel 230, it covers the majority of the pixel 230 area, and is hence allocated majority status for pixel 230.

In the present embodiment, once a majority status is determined for the pixel 230, the color for the pixel 230 is allocated in accordance with the majority status. For example, since the polygon 202 covers the majority of the pixel 230, the color from the triangle 202 will be allocated to the pixel 230, as opposed to the color from the triangle 201. Since the color from triangle 202 is allocated to the pixel 230, the pixel 230 only needs to be written to once.

Thus, the assigning of the majority status is configured to prevent multiple writes to the pixel 230 from the two polygons 202-203 and to prevent any blending of the colors of the two polygons to those pixels along the abutting edge 205. Additionally, since the color of the pixel 230 is allocated in accordance with the majority status, any blending of the background color along the abutting edge 205 is prevented, thereby preventing any background blended color appearing through the interior of a multi-triangle object. This feature eliminates a major source of rendering defects and artifacts common with prior art anti-aliasing techniques.

In this manner, embodiments of the present invention avoid having to blend colors from the adjacent polygons 201-202 while rendering pixels along their abutting edge 205 (e.g., pixel 230). However, it should be noted that image quality is maintained since anti-aliasing is performed on the other non-abutting edges (e.g., the outside edges). For example, the pixels along the other non-abutting edges have their colors blended with respect to a background color in accordance with their degree of coverage by the polygons 201-202. Anti-aliasing along internal abutting edges typically does not need to be performed since the abutting adjacent triangles are usually the same, or very close to the same, color. For example, in a triangle strip, common vertices defining abutting edges usually have the same color. This method does not apply when colors on opposite sides of the common edge are intended to be significantly different.

Figure 4:
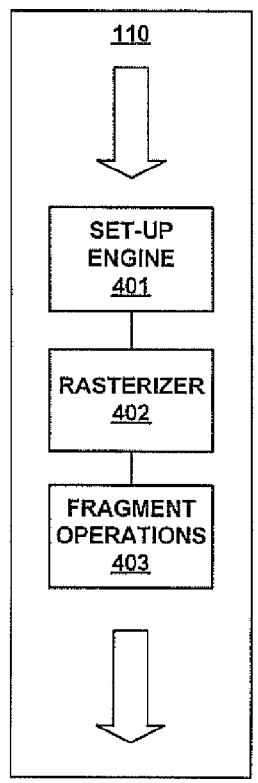
FIG. 4 shows a diagram depicting internal components of the GPU in accordance with one embodiment of the present invention.

FIG. 4 shows a diagram depicting internal components of the GPU 110 in accordance with one embodiment of the present invention. As shown in FIG. 4, the GPU 110 includes a setup engine 401, a rasterizer unit 402, and a fragment operations unit 403. In the present embodiment, the functionality of the present invention is implemented within the hardware and software of the rasterizer unit 402. Generally, the rasterizer unit 402 functions by converting descriptions based on vertices, received from the setup engine 401, to descriptions based on edge descriptions. The rasterizer unit 402 subsequently converts these edge descriptions into filled areas comprising actual pixel descriptions (e.g., pixel areas, pixel subsamples, etc.). The pixel descriptions are subsequently passed along to the fragment operations unit 403 that implements the blending of the assigned pixel descriptions, and subsequently on to other units within the GPU 110 for further processing and rendering.

Figure 5:
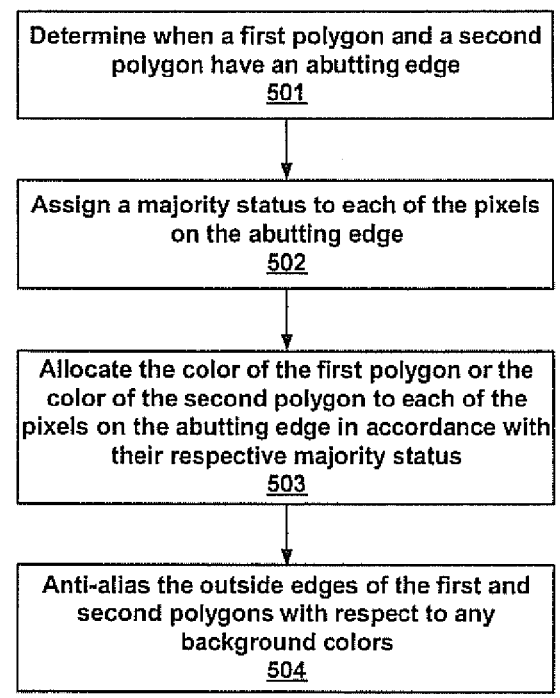
FIG. 5 shows a flowchart of the steps of a process in accordance with one embodiment of the present invention.

FIG. 5 shows a flowchart of the steps of a process 500 in accordance with one embodiment of the present invention. As depicted in FIG. 5, process 500 shows the operating steps of an adjacent polygon rendering process as performed by a GPU (e.g., GPU 110) of a computer system (e.g., computer system 100).

Process 500 begins in step 501, where the GPU 110 determines when a first polygon and a second polygon have an abutting edge. In step 502, as described above, a majority status is assigned to each of the pixels along the abutting edge. In step 503, the color is allocated from the first polygon or the second polygon to each of the pixels on the abutting edge. As described above, this color is allocated in accordance with the respective majority status for each of the pixels. In step 504, the outside edges of the polygons are anti-aliased with respect to any background colors. In this manner, the outside edges of the polygons are anti-aliased while preventing any background blend through on any of the interior abutting edges, and while preventing unnecessary multiple reads or writes to the same pixel.

Figure 6:
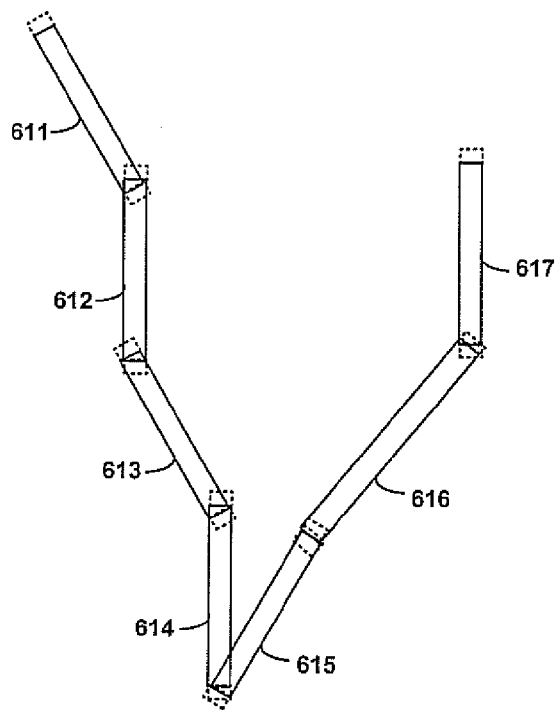
FIG. 6 shows a diagram of a line comprising a plurality of line primitives in accordance with one embodiment of the present invention.

FIG. 6 shows a diagram of a line 600 comprising a plurality of line primitives 611-617 in accordance with one embodiment of the present invention. As depicted in FIG. 6, the line 600 is made up of the individual line primitives 611-617, or line segments, lined up and attached to one another end-to-end via their respective vertices, as shown in FIG. 6. The individual line primitives 611-617 are used by the GPU 110 to render the line 600.

As shown in FIG. 6, in order to draw a line strip, such as line 600, comprising the multiple individual line segments 611-617 joined together, and in order to present a smooth and even appearance across the joins, special rendering techniques need to be used. Existing standards, such as, for example, OpenGL, require that the end of smooth segments be rectangular. However rectangular ends do not join smoothly when adjacent line segments meet at an angle This can be overcome through the use of end-caps at the ends of each of the line segments 611-617, such as, for example, the end-caps 622 and 623 for the line segment 612, that are used to ensure the line segments overlap and do not have gaps when they meet at angles.

Figure 7:
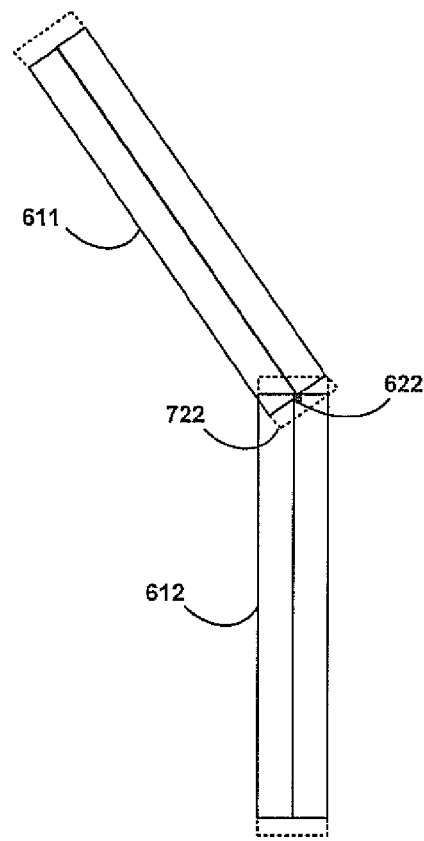
FIG. 7 shows a detailed diagram depicting the intersection between line segments.

FIG. 7 shows the intersection between segments 611 and 612 in greater detail. In a case where the line segments are narrow, one prior art approach functions by overlapping the ends of the line segments and blending them together to create a smooth appearance. As described above, one method by which this problem may be handled is through the use of end-caps for each line segment. FIG. 7 shows the end-cap 622 for line segment 612 and the end-cap 722 for line 611. Unfortunately, these overlapping end-caps create multiple overlapping reads and writes (e.g., overlapping read-modify-writes) to the same pixel, causing performance problems. For example, the fragment operations unit 403 of FIG. 4 would have to perform multiple read-modify-write operations to blend the overlapping end-caps. Furthermore, the multiple read-modify-write operations can collide, as they each seek to successively access the same memory location.

Embodiments of the present invention solve this problem by calculating a common slope for the intersection between adjacent line segments to replace the rectangular end with a generated, geometrically modified, abutting end. It should be noted that end-caps are not Illustrated in FIGS. 11 through 13 in order to avoid unnecessarily obscuring the depiction of certain line segments and their manner of joining, in accordance with embodiments of the present invention.

Figure 8:
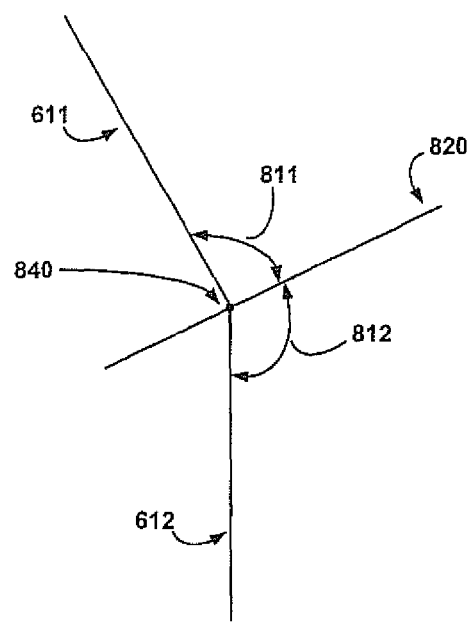
FIG. 8 shows a diagram illustrating the generation of the abutting edge between the line segments in accordance with one embodiment of the present invention.

FIG. 8 shows a diagram illustrating the generation of the abutting edge between the line segments 611 and 612 in accordance with one embodiment of the present invention. As described above, embodiments of the present invention calculate a common slope 811 and 812 for the intersection between adjacent line segments. This common slope 811-812 in turn defines the abutting edge 820 that will be common to both the line segments 611 and 612. In other words, the angle of the mitered end is computed by summing the direction vectors of the two lines leaving the common vertex (e.g., vertex 840), such that the angles 811 and 812 are equal.

Figure 9:
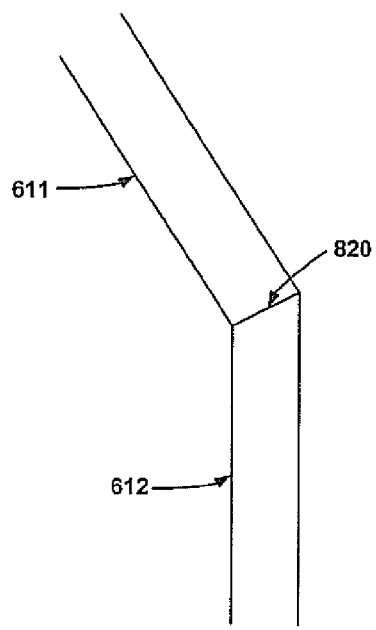
FIG. 9 shows the line segments with a common abutting edge in accordance with one embodiment of the present invention.

FIG. 9 shows the line segments 611 and 612 with a common abutting edge in accordance with one embodiment of the present invention. Thus, as shown in FIG. 9, the common abutting edge 820 provides for a clean, smooth continuous join between the line segments 611 and 612. Such an abutting edge can be referred to as a "mitered join" analogous to the mitered joins of work pieces as performed in carpentry (e.g., picture frames, etc.).

Figure 10:
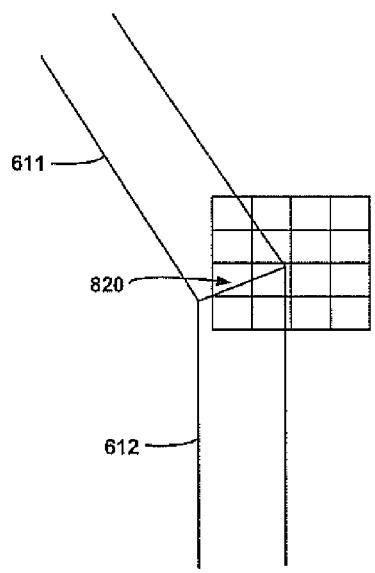
FIG. 10 shows the joined line segments rasterized against a grid of pixels in accordance with one embodiment of the present invention.

FIG. 10 shows the joined line segments 611 and 612 rasterized against a grid of pixels 1000 in accordance with one embodiment of the present invention. The mitered ends of the hue segments 611-612 provide a clean join. Embodiments of the present invention avoid multiple reads and writes to the same pixel by writing only those pixels whose center lies on the side of the mitered join (e.g., abutting edge 820) belonging to the line segment being rasterized. This is the same technique that is used for pixels along abutting edges of triangle strips, as described above.

In one embodiment, a majority status is assigned to a pixel on the abutting edge in the same manner as described above with the rendering of adjacent polygons that share a common abutting edge. A first color of the first line primitive or a second color of the second line primitive is allocated to the pixel in accordance with the majority status, wherein the majority status is determined by, for example, determining whether the first line primitive or the second line primitive covers a center of the pixel.

Figure 11:
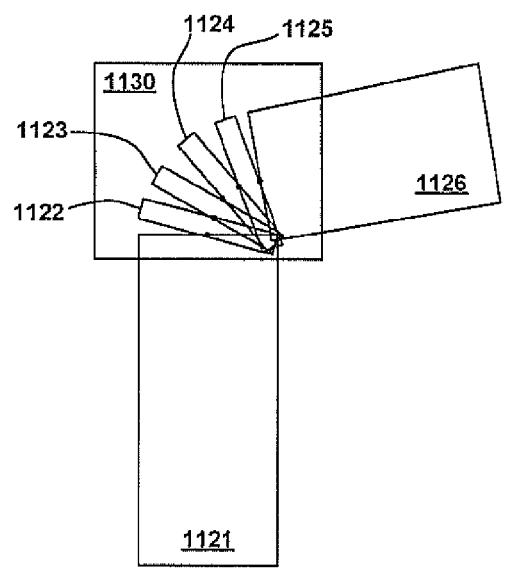
FIG. 11 shows a case where multiple short adjacent line segments comprise a portion of a larger line strip.

FIG. 11 shows a case where multiple short adjacent line segments 1122-1125 comprise a portion of a larger line strip including line segments 1121 and 1126.

FIG. 11 shows a special case wherein multiple short adjacent line segments 1122-1125 reside completely within a single pixel 1130. In one embodiment, in order to prevent multiple writes to the single pixel 1130, short lines that do not exit a pixel (e.g., line segments 1122-1125) can be culled, and their length accumulated until the pixel is exited (e.g., by line segment 1126). This avoids multiple writes to the same pixel and still maintains high quality results.

Figure 12:
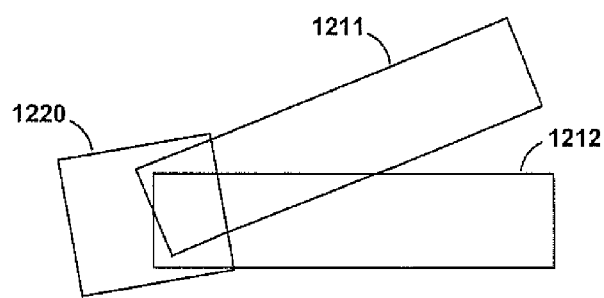
FIG. 12 shows a case where two line segments enter a pixel at an acute angle.
Figure 13:
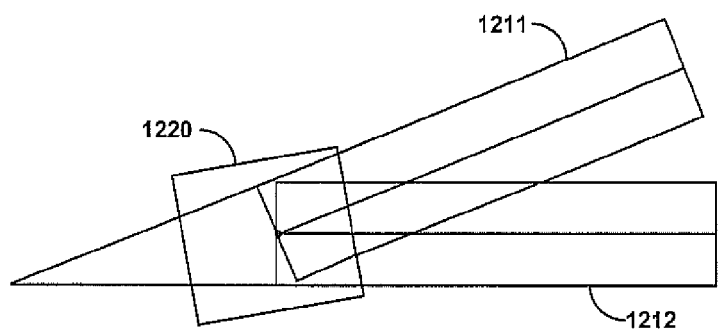
FIG. 13 shows a case where line segments join at an acute angle, and where the mitered join can extend a substantial distance from the line segments.

Referring now to FIG. 12 and FIG. 13, FIG. 12 shows a case where two line segments 1211 and 1212 enter a pixel 1220 at an acute angle. FIG. 13 shows a case where lines join at an acute angle, thereby causing the mitered join to possibly extend very far from the intersection (e.g., where the mitered join could conceivably extend several pixels to the left of pixel 1220). In one embodiment, the first line primitive 1211 and the second line primitive 1212 are cropped along the abutting edge by using a sub-pixel bounding box. The sub-pixel bounding box would be within the boundaries of the pixel 1220. The use of a sub-pixel bounding boxes, or rectangles, is described in greater detail below.

Figure 14:
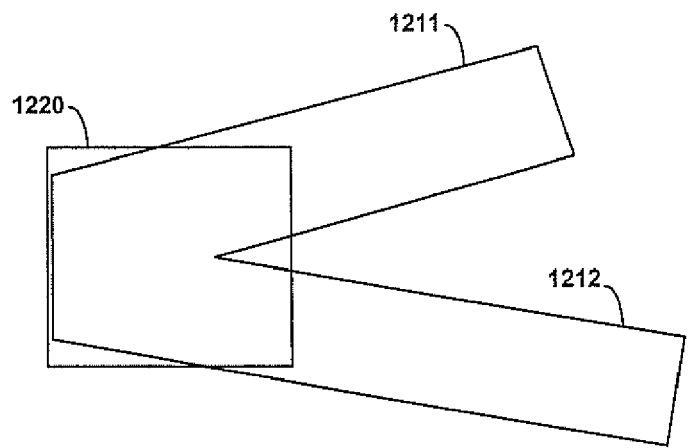
FIG. 14 shows a diagram of the joined line segments as cropped by a sub-pixel bounding box in accordance with one embodiment of the present invention.

FIG. 14 shows a diagram of the joined line segments 1211 and 1212 as cropped by a sub-pixel bounding box in accordance with one embodiment of the present invention. Thus, as shown in FIG. 14, the joined line segments 1211 and 1212 do not extend beyond the edge of the pixel 1220. The sub-pixel bounding box is particularly well-suited for use with narrow line segments. Alternatively, for wide line segments, acute angles can be tested for, and if present, the line segments can be reverted to rectangular ends. In another embodiment, a line defined by the abutting edge (e.g., mitered end) can be rotated by 90 degrees and used to cap the sharp point made by the join. The location of the cap can be determined by the width of the line and vertex position.

It should be noted that as with the rendering of adjacent polygons having a common abutting edge, at least one edge of the first line primitive or the second line primitive other than the abutting edge is anti-aliased with respect to a background color, and the abutting edge is configured to provide a continuous join between the first line primitive and the second line primitive. Additionally, it should be noted that in the present embodiment, the functionality of the present invention is implemented within the hardware and software of the rasterizer unit 402, shown in FIG. 4.

Figure 15:
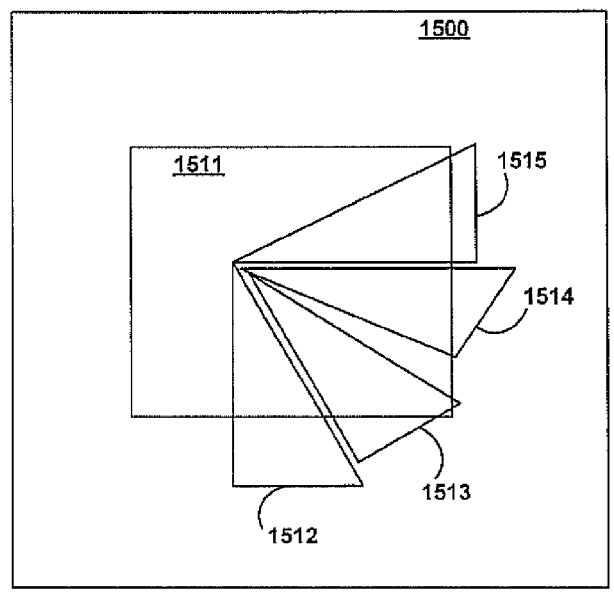
FIG. 15 shows a diagram depicting a screen and a bounding rectangle along with a plurality of polygons in accordance with one embodiment of the present invention.

FIG. 15 shows a diagram depicting a screen 1500 and a bounding rectangle 1511 along with a plurality of polygons 1512-1515 in accordance with one embodiment of the present invention. As depicted in FIG. 15, the bounding rectangle 1511, or bounding box, is used to clip the polygons 1512-1515 to a region within the bounding rectangle 1511.

Referring still to FIG. 15, traditionally windows, view ports, scissors and other pixel-limiting rectangles (e.g., bounding rectangle 1511) have been defined in terms of pixels. For example, a given bounding rectangle would be defined by the number of pixels high and the number of pixels wide (e.g., 480 pixels×640 pixels, etc.). However, embodiments of the present invention advantageously use sub-pixel limits to define such bounding rectangles.

Figure 16:
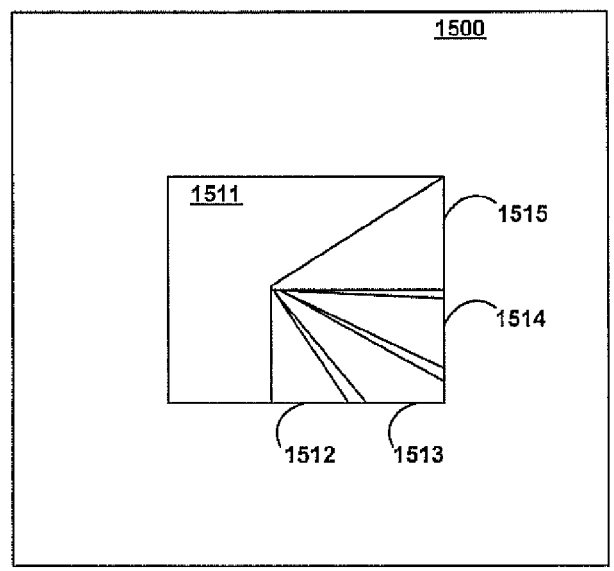
FIG. 16 shows a diagram depicting the plurality of polygons clipped by the bounding rectangle in accordance with one embodiment of the present invention.

FIG. 16 shows a diagram depicting the plurality of polygons 1512-1515 clipped by the bounding rectangle 1511 in accordance with one embodiment of the present invention.

Referring to FIG. 16, if smooth motion is desired when dragging windows (e.g., the window defined by the bounding rectangle 1511) or other rectangular areas around the screen, sub-pixel precision is necessary to keep the boundaries from "popping" from one pixel column or scan line to the next, as would be the case if the bounding rectangle/box is defined by pixel based dimensions (e.g., the number of pixels high/ wide). Embodiments of the present invention utilize an architecture whereby the bounding rectangle 1511 is defined to sub-pixel dimensions. Since the bounding rectangle 1511 is defined to sub-pixel dimensions, the precise coverage of each pixel can be accurately calculated as the bounding rectangle is moved across the screen 1500. This precise coverage enables a robust and accurate anti-aliasing of the edges of the bounding rectangle 1511 with respect to the background colors of the screen 1500. Additionally, this precise coverage limits the number of samples and/or the amount of area produced when the primitive shapes (e.g., the polygons 1512-1515) are rasterized.

Figure 17:
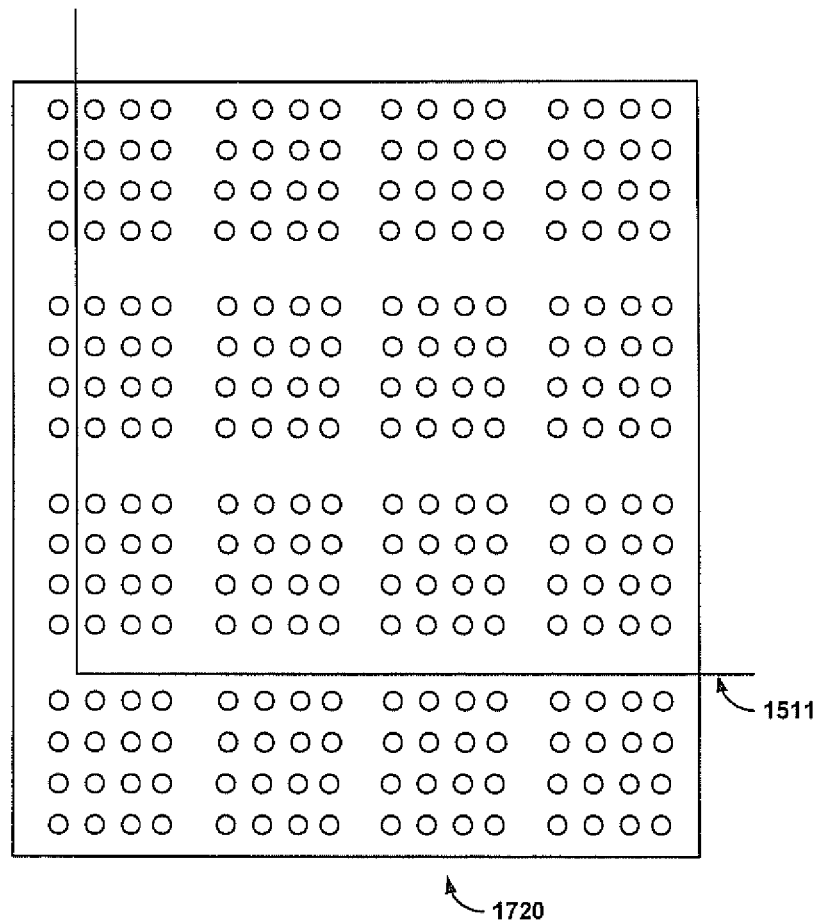
FIG. 17 shows a diagram showing the bottom left edge of the bounding rectangle covering a portion of the samples of a pixel.

FIG. 17 shows a diagram showing the bottom left edge of the bounding rectangle 1511 covering a portion of a pixel 1720. As shown in FIG. 17, the pixel 1720 includes a 16×16 grid of sample points (e.g., a subset of 16 of these sample points could be used in 16× multisampling). As depicted in FIG. 17, a sub-pixel bounding box serves to avoid overlap so that adjacent pixels are not touched when near the boundary. When rasterizing geometric primitives (e.g., quadrilaterals, triangles, lines, points, or any other geometric primitive shape) a bounding box serves to define the limits within which the shape must be drawn and avoid spending time on areas of the screen that don't intersect the rectangle. For example, when multisampling in a 16×16 grid as depicted in FIG. 17, no sample point is closer than $\frac{1}{16}$ pixel to a tile boundary. Using a sub-pixel bounding box that stays $\frac{1}{16}$ pixel inside the pixel limits allows more areas of the screen to be clearly rejected by avoiding false hits due to less precise evaluations. This feature makes the overall rendering operations performed by the GPU 110 faster. Although FIG. 17 depicts a 16×16 grid, other size grids can be implemented (e.g., 4×4, 8×8, etc.), such as, for example, other regular or randomly spaced collection(s) of points with the region assigned to a given pixel.

A sub-pixel bounding rectangle (e.g., bounding rectangle 1511) can be useful for solving some difficult rasterization problems. As described above, when rasterizing mitered lines, lines joining at acute angles protrude outward farther than they should. A sub-pixel bounding box can be used to limit their protrusion extent smoothly during real-time rendering so that no sudden changes of shading can be seen when such joins are moving around the screen 1500. Additionally, it should be noted that in the present embodiment, the bounding rectangle functionality of the present invention is implemented within the hardware and software of the rasterizer unit 402, shown in FIG. 4.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering a plurality of line primitives by using a processor, comprising:
    accessing a first line primitive and a second line primitive within a line strip; for a junction between the first line primitive and the second line primitive,
    geometrically modifying the first line primitive and the second line primitive to generate an abutting edge between the first line primitive and the second line primitive;
    assigning a majority status to a pixel on the abutting edge, wherein the majority status is determined by determining whether the first line primitive or the second line primitive covers a center of the pixel in accordance with the abutting edge; and
    using the processor, causing the pixel to display a certain color by allocating a first color of the first line primitive or a second color of the second line primitive to the pixel in accordance with the majority status.

2. The method of claim 1, wherein at least one edge of the first line primitive or the second line primitive other than the abutting edge is anti-aliased with respect to a background color.

3. The method of claim 1, wherein the abutting edge is configured to provide a continuous join between the first line primitive and the second line primitive.

4. The method of claim 1, wherein an angle of the abutting edge is computed by summing respective direction vectors of the first line primitive and the second line primitive.

5. The method of claim 1, wherein the assigning of the majority status is configured to avoid multiple reads or writes to the pixel from the first line primitive and the second line primitive.

6. The method of claim 1, further comprising:
    avoiding any blending of a background color with the first line primitive or the second line primitive along the abutting edge.

7. The method of claim 1, further comprising:
    accumulating a plurality of line primitives between the first line primitive and the second line primitive and that do not exit the pixel to prevent multiple reads or writes to the pixel resulting from the plurality of line primitives that do not exit the pixel.

8. The method of claim 1, further comprising:
    cropping the first line primitive and the second line primitive near the abutting edge.

9. The method of claim 8, wherein a sub-pixel bounding box is used to crop the first line primitive and the second line primitive.

10. The method of claim 8, wherein a line rotated to a right angle to the abutting edge is used to crop the first line primitive and the second line primitive.

11. A graphics processor unit, comprising:
    a set-up unit for generating polygon descriptions;
    a rasterizer coupled to the set-up unit for rasterizing the polygon descriptions, wherein the rasterizer that accesses a first line primitive and a second line primitive of a line strip, for a junction between the first line primitive and the second line primitive, geometrically modifies the first line primitive and the second line primitive to generate an abutting edge between the first line primitive and the second line primitive, assigns a majority status to a pixel on the abutting edge, cropping the first line primitive and the second line primitive near the abutting edge, and allocates a color to the pixel in accordance with the majority status.

12. The graphics processor unit of claim 11, wherein at least one edge of the first line primitive or the second line primitive other than the abutting edge is anti-aliased with respect to a background color.

13. The graphics processor unit of claim 11, wherein the abutting edge is configured to provide a continuous join between the first line primitive and the second line primitive, and wherein an angle of the abutting edge is computed by summing respective direction vectors of the first line primitive and the second line primitive.

14. The graphics processor unit of claim 11, wherein the majority status is determined by determining whether the first line primitive or the second line primitive covers a center of the pixel in accordance with the abutting edge.

15. The graphics processor unit of claim 11, wherein the assigning of the majority status is configured to prevent multiple writes to the pixel from the first line primitive and the second line primitive.

16. The graphics processor unit of claim 11, further comprising: preventing any blending of a background color with the first line primitive or the second line primitive along the abutting edge.

17. A computer system, comprising:
a central processing unit;
a memory coupled to the central processing unit; and
a graphics processor unit communicatively coupled to the central processing unit and comprising:
a set-up unit for generating polygon descriptions;
a rasterizer coupled to the set-up unit for rasterizing the polygon descriptions, wherein the rasterizer accesses a first line primitive and a second line primitive of a line strip, for a junction between the first line primitive and the second line primitive, geometrically modifies the first line primitive and the second line primitive to generate an abutting edge between the first line primitive and the second line primitive, assigns a majority status to a pixel on the abutting edge, cropping the first line primitive and the second line primitive near the abutting edge, and allocates a color to the pixel in accordance with the majority status.

18. The computer system of claim 17, further comprising: a fragment operations unit for blending rasterized line primitives by reading a frame buffer and writing results back to the frame buffer, wherein the results are written without conflicts for mitered end-caps of the rasterized line primitives.

19. The computer system of claim 17, wherein at least one edge of the first line primitive or the second line primitive other than the abutting edge is anti-aliased with respect to a background color.

20. The computer system of claim 17, wherein the majority status is determined by determining whether the first line primitive or the second line primitive covers a center of the pixel in accordance with the abutting edge, and wherein the abutting edge is configured to provide a continuous join between the first line primitive and the second line primitive, and wherein an angle of the abutting edge is computed by summing respective direction vectors of the first line primitive and the second line primitive.

* * * * *